United States Patent
Cornic et al.

(10) Patent No.: US 9,664,778 B2
(45) Date of Patent: May 30, 2017

(54) RADAR WITH LOW INTERCEPTION PROBABILITY

(71) Applicant: THALES, Neuilly-sur-Seine (FR)

(72) Inventors: Pascal Cornic, Guilers (FR); Stephane Kemkemian, Paris (FR); Jean-Paul Artis, Plouzane (FR)

(73) Assignee: THALES, Courbevoie (FR)

( * ) Notice: Subject to any disclaimer, the term of this patent is extended or adjusted under 35 U.S.C. 154(b) by 325 days.

(21) Appl. No.: 14/382,513

(22) PCT Filed: Feb. 28, 2013

(86) PCT No.: PCT/EP2013/054041
§ 371 (c)(1),
(2) Date: Sep. 2, 2014

(87) PCT Pub. No.: WO2013/127926
PCT Pub. Date: Sep. 6, 2013

(65) Prior Publication Data
US 2015/0061928 A1    Mar. 5, 2015

(30) Foreign Application Priority Data
Mar. 2, 2012   (FR) ..................... 12 00627

(51) Int. Cl.
*G01S 7/282*   (2006.01)
*G01S 7/35*    (2006.01)
(Continued)

(52) U.S. Cl.
CPC ............... *G01S 7/35* (2013.01); *G01S 13/02* (2013.01); *G01S 13/343* (2013.01); *G01S 13/9035* (2013.01); *G01S 2013/0281* (2013.01)

(58) Field of Classification Search
CPC ........... G01S 7/35; G01S 13/02; G01S 13/343
(Continued)

(56) References Cited

U.S. PATENT DOCUMENTS 6,031,485 A  *  2/2000  Cellai ................... G01S 13/003
                                                    342/131
7,317,427 B2 *  1/2008  Pauplis ................ G01S 7/2813
                                                    342/16
(Continued)

FOREIGN PATENT DOCUMENTS

EP   0893703 A1   1/1999
EP   2296006 A2   3/2011
EP   2296007 A1   3/2011

OTHER PUBLICATIONS

Par Francois Le Chevalier, et al., "Coloured Transmission for Radar Active Antenna", REE Revue Generale de L'Electricite et de L'Electronique, Mar. 1, 2005, pp. 48-52, No. 6, Revue Generale de L'Electricite S.A., FR, XP001536744.
(Continued)

*Primary Examiner* — Marcus Windrich
(74) *Attorney, Agent, or Firm* — Baker Hostetler LLP

(57) ABSTRACT

A radar and method for making a radar undetectable, comprising comprises: on a transmit antenna consisting of N individual subarrays that are non-directional in at least one plane in transmission, each being linked to a waveform generator, generating, for each of the individual subarrays, a waveform so as to make each of the individual subarrays transmit continuous or quasi-continuous signals according to a temporal and periodic pattern by using transmission patterns made up of N different subarrays and which are deduced from one another by an individual delay, on the receive antenna comprising M individual subarrays adapted to pick up the reflected signals obtained from the transmission of the N individual subarrays of the transmit antenna, performing a compression of the received signal in space and in time of the received signals.

9 Claims, 11 Drawing Sheets

(51) Int. Cl.
*G01S 13/34* (2006.01)
*G01S 13/90* (2006.01)
*G01S 13/02* (2006.01)

(58) Field of Classification Search
USPC .................. 342/25 R–25 F, 368, 371, 372
See application file for complete search history.

(56) References Cited

U.S. PATENT DOCUMENTS

| | | | |
|---|---|---|---|
| 2006/0197699 A1* | 9/2006 | Cornic | .................... G01S 7/032 |
| | | | 342/26 R |
| 2007/0182619 A1* | 8/2007 | Honda | ................... H01Q 25/02 |
| | | | 342/80 |
| 2010/0085237 A1* | 4/2010 | Cornic | ................... G01S 13/913 |
| | | | 342/33 |
| 2011/0140952 A1 | 6/2011 | Kemkemian et al. | |
| 2011/0221625 A1 | 9/2011 | Cornic et al. | |

OTHER PUBLICATIONS

B.E. Andersson, et al., "FMCW and Super Resolution Techniques Applied to an LPI Short Range Air Search Radar", Radar 1997, Oct. 14, 1997, pp. 406-410, vol. No. 449, London, IEEE, GB, XP006508978.

\* cited by examiner

RADAR WITH LOW INTERCEPTION PROBABILITY

CROSS-REFERENCE TO RELATED APPLICATIONS

This application is a National Stage of International patent application PCT/EP2013/054041, filed on Feb. 28, 2013, which claims priority to foreign French patent application No. FR 1200627, filed on Mar. 2, 2012, the disclosures of which are incorporated by reference in their entirety.

FIELD OF THE INVENTION

The invention relates to radars with low interception probability which are difficult to detect.

It applies to radars that have an SAR function.

BACKGROUND

These days there exist radars with low probability of intercept, abbreviated LPI, which mostly use continuous or quasi-continuous transmission techniques, aiming to reduce the transmitted peak power.

These continuous transmission techniques, when they are employed alone, can be controlled by the implementation of modern detectors that use suitable processing operations that allow for a coherent integration of the signal over a long time, typically from one to several tens of ms.

Also, radars with continuous waves exhibit a major drawback, relating to the coupling between the transmission and the reception which are simultaneous, which tends to greatly limit their use when the required range is great, typically beyond one to several tens of km. A first problem to be resolved is therefore how to strengthen the "discretionary" nature of the radars in order for their detection to be as difficult as possible. A second problem is how to increase the range of the discreet radars.

Through their design, the abovementioned LPI radars are difficult to detect. These radars are conventionally radars with continuous waves, frequency modulation continuous wave (FMCW) or frequency shift keying (FSK) radars or even phase shift keying (PSK) radars or radars of Barker type that are known to those skilled in the art. The LPI radars are difficult to detect by conventional detectors which seek to detect a peak high power radar pulse. Moreover, the radars with continuous or quasi-continuous transmission are limited in range, because of the leaks between the transmitter and the receiver.

Hereinafter in the description, the expression "individual subarray" denotes an assembly consisting of several transmit or receive antenna elements. An antenna array or antenna consists of N individual transmitting subarrays or M receiving subarrays. The structure of the transmitting or receiving antennas or antenna array is of multiple input multiple output, or MIMO, type known to those skilled in the art. The individual subarrays can be identified in the antenna by an index.

The word "chirp" in this description describes a frequency ramp.

SUMMARY OF THE INVENTION

The idea behind the present invention is notably to offer a radar that has a structure that makes it possible to transmit an energy without focus or with a low focus in at least one plane in transmission, with low peak power and within a great frequency bandwidth, which makes it extremely difficult to intercept. The architecture of the radar according to the invention notably comprises array antennas in transmission and in reception of multiple input multiple output, or MIMO, type associated with a frequency, space and time spreading technique.

The subject of the invention is a radar comprising at least one transmit antenna consisting of N individual subarrays that are non-directional in at least one plane in transmission, and a receive antenna consisting of M individual subarrays, the transmissions of the subarrays are orthogonal to one another by virtue of their frequency separation and each covers a sub-band of the same width $\Delta F/N$, said corresponding sub-bands being separated from one another, the radar comprising:

On the Transmit Antenna

An individual subarray of the transmit antenna is linked to a waveform generator, At least one oscillator linked with the N waveform generators associated with the N individual subarrays, forming an assembly adapted to generate, for each of the individual subarrays, a waveform such that each of the individual subarrays transmits continuous or quasi-continuous signals according to a temporal and periodic pattern such that:

- The transmission pattern covers a bandwidth $\Delta F$ for a given duration $T_m$,
- The transmission pattern is made up of N mutually different sub-patterns, the duration of a pattern being equal to $T_m/N$, and covers a sub-band of the total frequency band $\Delta F$,
- The patterns transmitted by the different subarrays are deduced from one another by individual delays which are multiples of $T_m/N$, the N sub-patterns transmitted by the subarrays being different during each time interval of duration $T_m/N$, On the Receive Antenna Each of the M individual subarrays of the receive antenna is adapted to pick up the reflected signals obtained from the transmission of the N individual subarrays of the transmit antenna, The receive antenna comprises means adapted to perform a compression of the received signal in space and in time.

The oscillator can be adapted to generate, on the individual subarrays, simultaneous transmissions in different and separate frequency bands.

Each subarray is, for example, adapted to cover all the bandwidth $\Delta F$ during a pattern $T_m$.

The transmission pattern is, for example, a frequency ramp.

According to one embodiment, the N waveform generators are independent.

The radar comprises, for example, in reception, frequency filtering means adapted to reduce the transmission leaks of the different transmit subarrays.

The radar can comprise a single pilot oscillator linked with the N wave generators, said oscillator being adapted to perform the pattern transmission synchronization.

The radar according to the invention comprises, for example, an SAR radar function.

The invention relates also to a method for attenuating the detection of a radar, characterized in that said method is implemented in a radar exhibiting at least one of the abovementioned features and in that it comprises a step consisting in spreading the energy produced by a radar in time, space and the frequency domain.

The method can comprise at least the following steps:
On a transmit antenna consisting of N individual subarrays that are non-directional in at least one plane in transmission, each linked to a waveform generator, generating, for each of the individual subarrays, a waveform such that each of the individual subarrays transmits continuous or quasi-continuous signals according to a temporal and periodic pattern so as to:
use a transmission pattern that covers a bandwidth ΔF for a duration Tm,
the transmission pattern is made up of N mutually different sub-patterns, the duration of a pattern being equal to Tm/N,
the patterns transmitted by the different subarrays are deduced from one another by individual delays which are Tm/N multiples, the N sub-patterns transmitted by the subarrays being different during each time interval of duration Tm/N,
On the receive antenna comprising M individual subarrays adapted to pick up the reflected signals obtained from the transmission of the N individual subarrays of the transmit antenna,
performing a compression of the received signal in space and in time of the received signals.

BRIEF DESCRIPTION OF THE DRAWINGS

Other features and advantages of the device according to the invention will become more apparent on reading the following description of an exemplary embodiment given as a nonlimiting illustration, with attached figures which represent.

DETAILED DESCRIPTION

Before describing an example of a radar according to the invention and its implementation, a few recaps concerning the principles used in transmission and in reception of the signal will be explained for a radar comprising, in the transmitter, an array antenna in transmission and an array antenna in reception in accordance with the abovementioned MIMO architectures. Each of these antennas consists, for example, of subarrays that are identical and non-directional in at least one plane in transmission.

Figure 1:
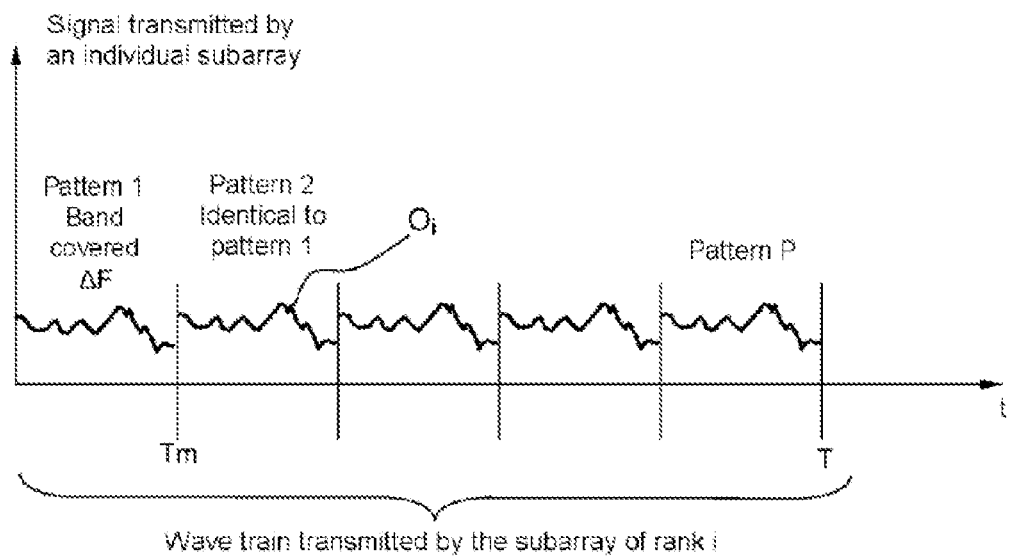
FIG. 1, the representation of a wave train transmitted by an antenna subarray of rank i, FIG. 2, an example of the signals transmitted over time from the different subarrays of the transmit antenna, for the individual pattern of FIG. 1, FIG. 3, an example of a signal transmitted by an individual subarray, FIG. 4, a spectral occupancy diagram, FIG. 5A, an example of a configuration of N subarrays in transmission and FIG. 5B M antenna subarrays in reception, FIG. 6, an example of an architecture for the control of the waveform generators, FIG. 7, an example of sub-pattern distribution, FIG. 8, a particular case in which the same pattern feeds the different subarrays, FIG. 9, an example of sub-patterns assigned in any order to the transmission of the subarrays, FIG. 10, a representation of the propagation delays, FIG. 11, an embodiment for the incoming filtering of the signals, and FIG. 12, an example of the signal processing steps in reception.

FIG. 1 schematically represents, in a system of axes in which the x axis represents the time and the y axis the amplitude of the signal transmitted by an individual subarray, a wave train transmitted by the subarray of rank i.

In transmission, all the individual subarrays of the transmit antenna simultaneously transmit one and the same wave train on a carrier frequency f, with, for each individual subarray, a different delay τ relative to a common time origin. This wave train transmitted for example by the subarray of rank i, as represented in FIG. 1, consists of a succession of patterns Oi, for example, that are identical and each cover a given wide frequency band ΔF during a given time period Tm. The wave trains transmitted by the different subarrays are all delayed relative to one another by a regular pitch which is a function of the index of the subarray. The delay τ corresponds for example to Tm divided by the number N of transmit subarrays. In this figure, all the patterns are identical.

Figure 2:
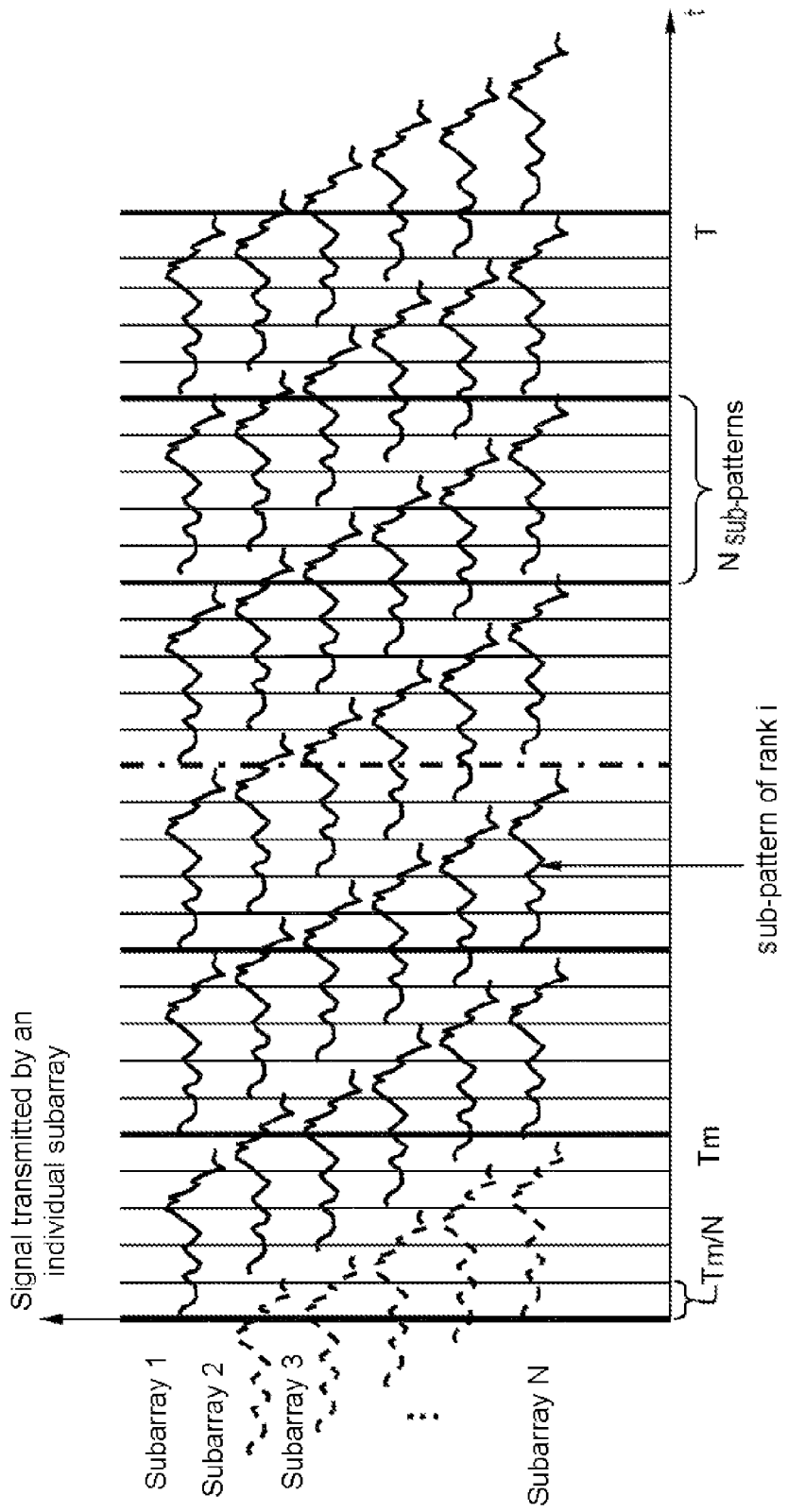

FIG. 2 schematically represents an example of the signals transmitted over time from the different subarrays, for the individual pattern of FIG. 1.

Figure 3:
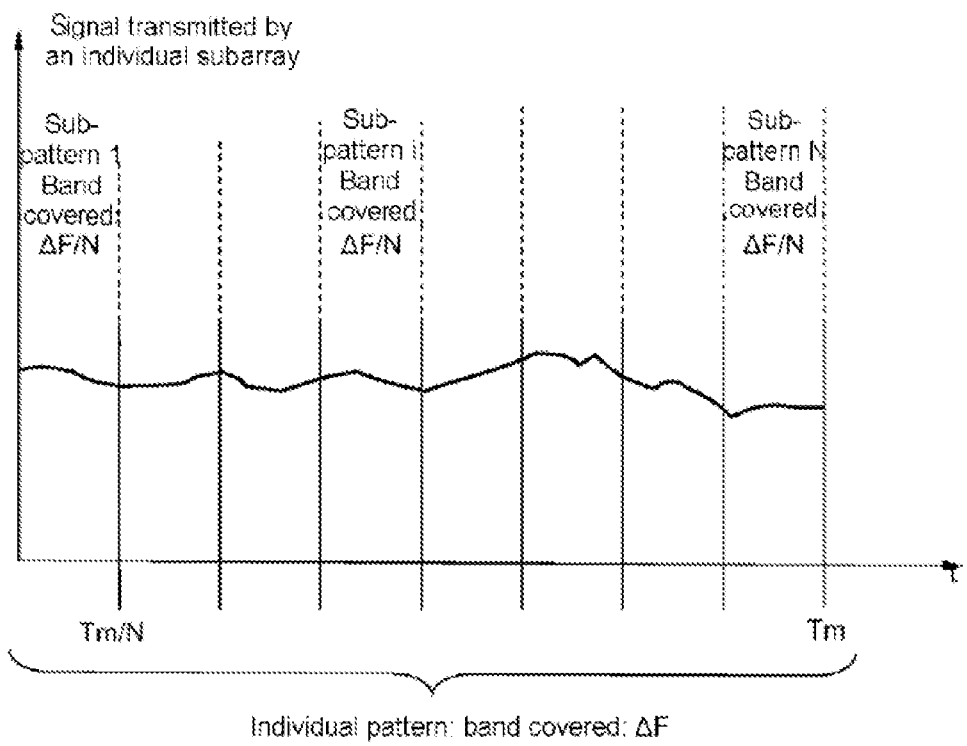

Each pattern is itself made up of N mutually different sub-patterns, N being equal to the number of subarrays, each sub-pattern having the same duration Tm/N and covering a sub-band of the total frequency band ΔF. The sub-bands corresponding to orthogonal transmissions each cover a sub-band of the same width ΔF/N and are separated from one another, that is to say that there is no signal overlap between two consecutive sub-bands. This notably enables the series of the sub-patterns to cover all of the band ΔF. FIG. 3 gives an example of a signal transmitted by an individual subarray for a number of sub-patterns equal to 8 and $T_m$=T/8 in a diagram in which the x axis is a time axis and the y axis is the signal transmitted by an individual subarray. The patterns transmitted by the individual subarrays are deduced from one another by individual delays which are multiples of Tm/N. It can be seen in FIG. 3 that every Tm/N, the sub-pattern $O_1$, $O_2$, . . . $O_8$ used for the covered band ΔF/N varies over time.

For the duration of a sub-pattern, the transmissions of all the subarrays are orthogonal to one another by virtue of their frequency separation and the band covered is ΔF/N.

Figure 4:
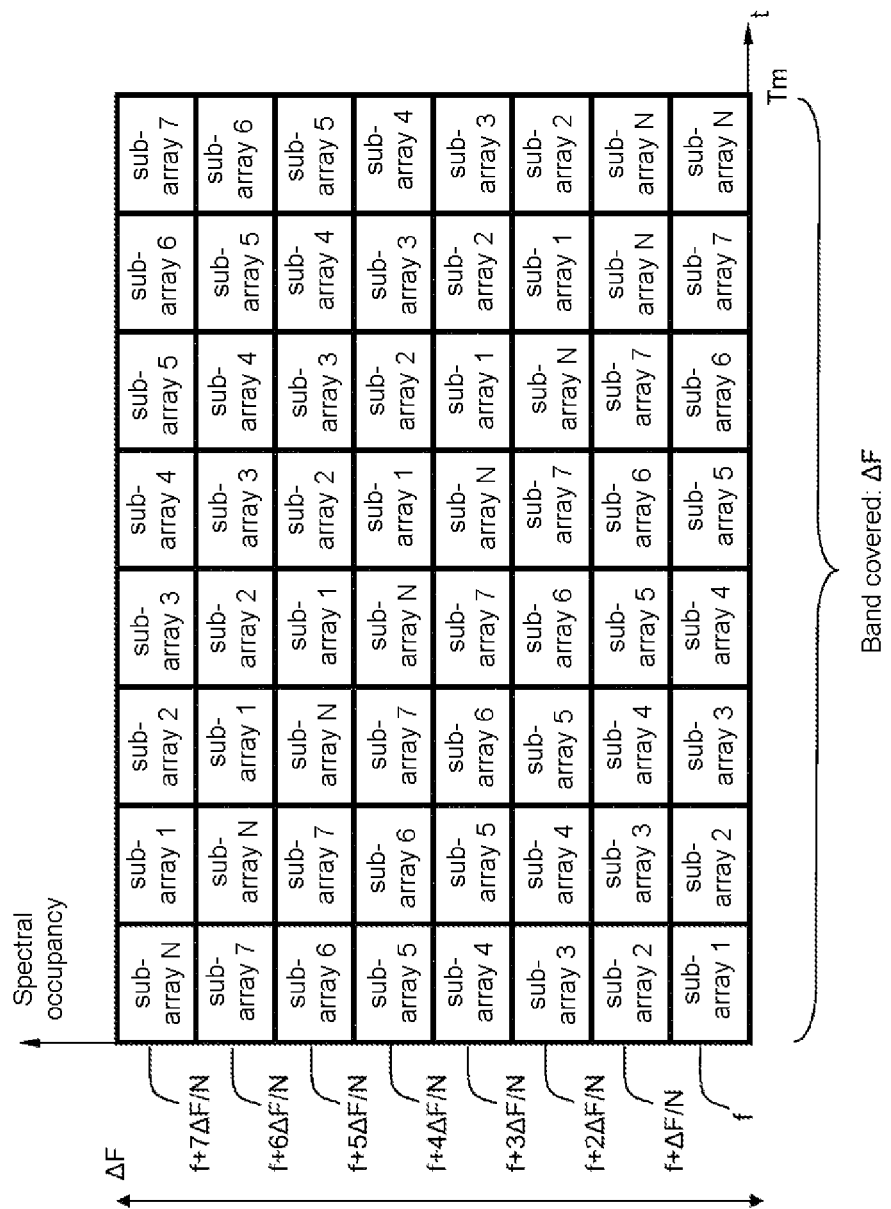

FIG. 4 schematically represents the spectral occupancy for all of the covered band ΔF. The x axis corresponds to the time. The y axis gives, for an individual subarray, the value of the sub-pattern in transmission. Thus, considering the first column, starting from the bottom of the y axis, the frequency pattern f is used by the subarray 1, the pattern f+ΔF/N by the subarray 2, and so on up to the pattern f+7 ΔF/N, which is used by the subarray N. For the time interval following 2 Tm/N, the pattern f is used by the subarray 2, . . . pattern f+7 ΔF/N is used by the subarray 1. All the individual subarrays transmit simultaneously, so that the band covered for the duration of a sub-pattern by all of the subarrays 1 to N is equal to the total band covered during a complete pattern by a single subarray. In FIG. 4, the number of the subarrays is equal to 8.

The order of assignment of the sub-patterns to the individual subarrays is immaterial, subject to the sole condition that, in each time period corresponding to the duration of a sub-pattern, the entire transmission band is covered.

By this transmission method, the different subarrays transmit orthogonal waves, and the resulting antenna gain is the gain of an antenna of an individual subarray.

In reception, each individual subarray of index j picks up the signals reflected by an obstacle in response to the signals transmitted by the N individual subarrays. The signals are then subjected to a processing operation, detailed later in the description, which performs a compression of the three-dimensional signal:

over time, pulse compression, on the antenna beam in transmission, beam forming in transmission, on the antenna beam in reception, beam forming in reception, on the speed, Doppler processing from recurrence to recurrence.

Figure 5A:
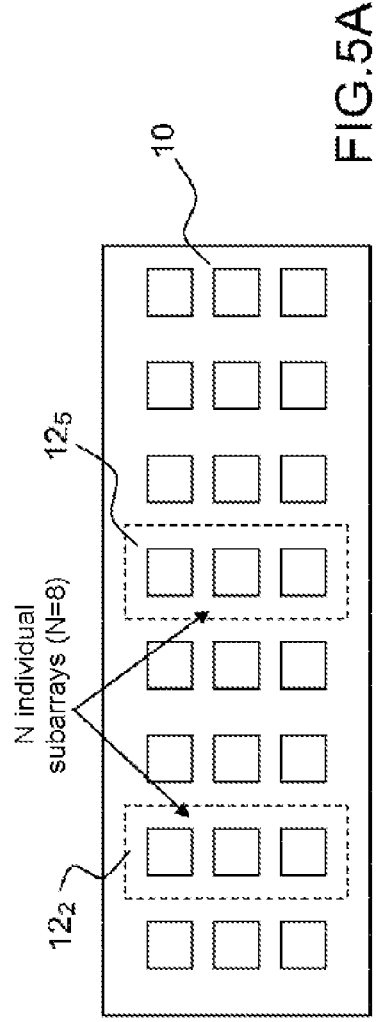

FIG. 5A schematically represents a transmit antenna 10 consisting of N individual subarrays 12$i$; in the figure N=8. The transmit antenna is chosen to have little directionality in at least one plane in transmission.

Figure 5B:
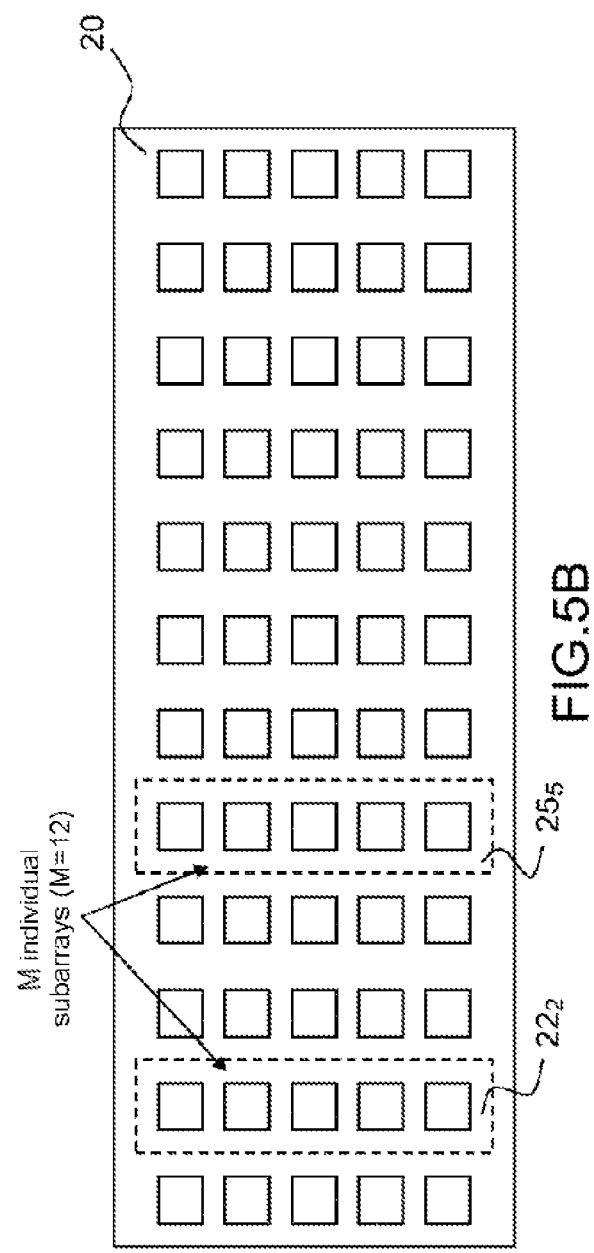

FIG. 5B represents an example of a receive antenna 20 consisting of M individual subarrays 22$j$; in this example M=12. In this example, the N subarrays are identical and nondirectional.

It is possible to have an equal number of individual subarrays in transmission and in reception, N=M.

Figure 6:
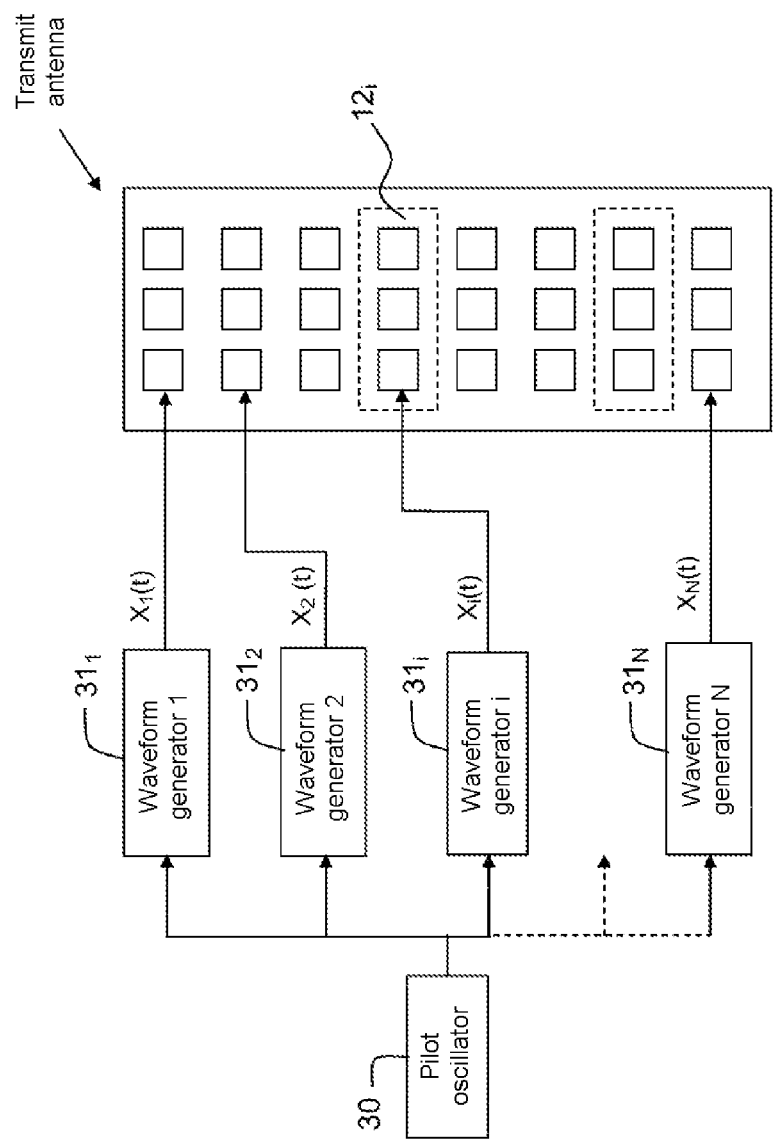

FIG. 6 represents an example of an architecture for the transmission of the signal. A pilot oscillator 30 is linked to N waveform generators 31$i$. The function of the pilot oscillator 30 is notably to ensure the transmission synchronization of the waveform generators. It controls the phase of the transmitted signals so that, on reception of the signals reflected by an obstacle, the method of separation and the method of reconstruction of the signals can be performed. A waveform generator 31$i$ is linked to an individual subarray of index i of the transmit antenna. Thus, the waveform generator 31$_1$ will transmit the signal $X_1(t)$ to the first transmit subarray 12$_1$, and so on up to the waveform generator 31$_N$ which transmits the wave $X_N(t)$ to the individual subarray of index N.

The wave train used has a duration T and it is made up of N periodic patterns of duration Tm and of period Tr, each pattern covering a transmission band ΔF during a period Tr.

The pattern can consist of a frequency- or phase-modulated carrier of frequency f, with the condition that it can be temporally subdivided into N adjacent sub-patterns, each sub-pattern occupying a different sub-band of width ΔF/N. The number N of sub-patterns is equal to the number N of individual subarrays.

On the receive antenna, the radar according to the invention comprises a waveform generator, adapted to reproduce the form of the transmission signal from any one of the transmit subarrays.

Figure 7:
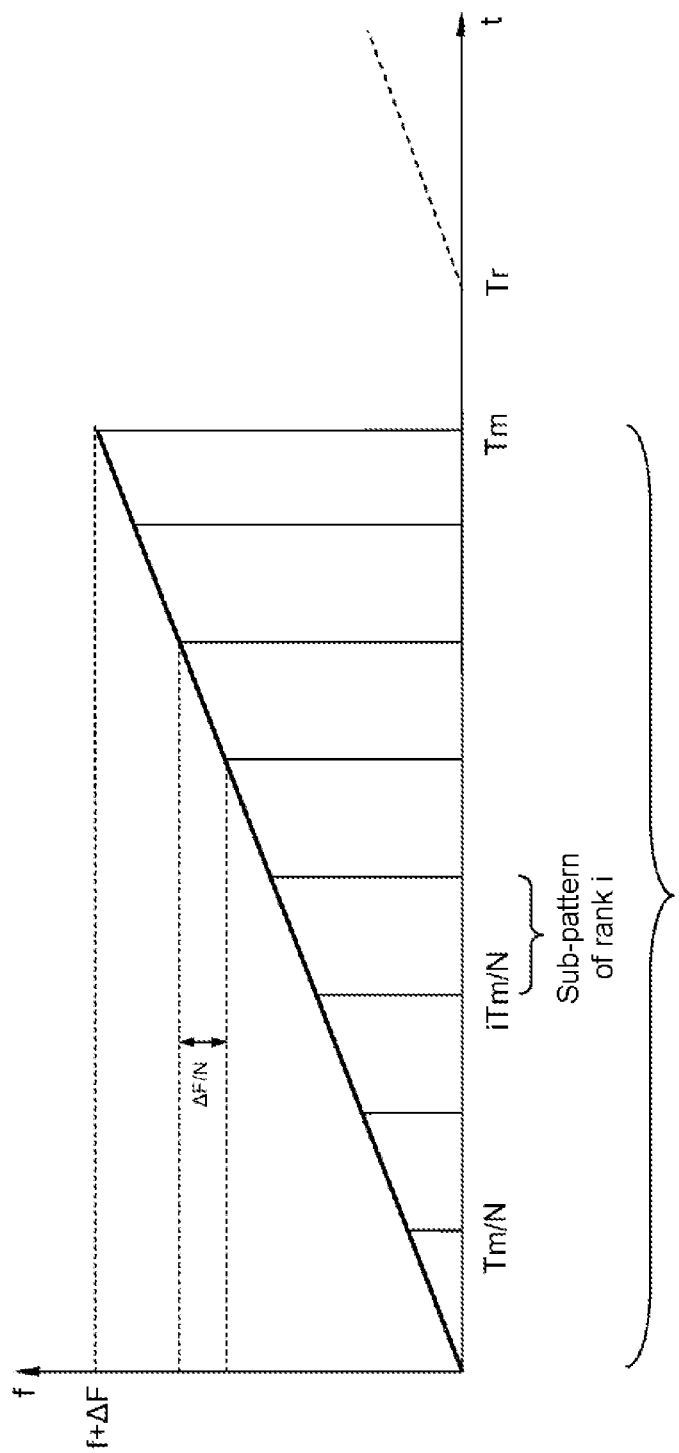

An example of a waveform is represented in FIG. 7 in a diagram in which the x axis corresponds to the time and which shows an individual pattern made up of a frequency ramp which is itself broken down into frequency sub-bands of amplitude ΔF/N corresponding to N sub-patterns.

According to one embodiment, the frequency ramps are reproduced periodically according to a period Tr. The transmitted signal can be interrupted, or continuous if the duration of the pattern is equal to the duration of the period Tr. This notably makes it possible to use all the available power on the transmitter, and to spread the transmitted energy over the maximum of time. The example of the figure the transmitted signal is interrupted for a duration of approximately Tm/N and restarts at the point Tr.

During each time slice Tm/N, each sub-pattern $O_k$ of index k is used to feed the transmission of a given subarray 12$_i$ of index i.

Figure 8:
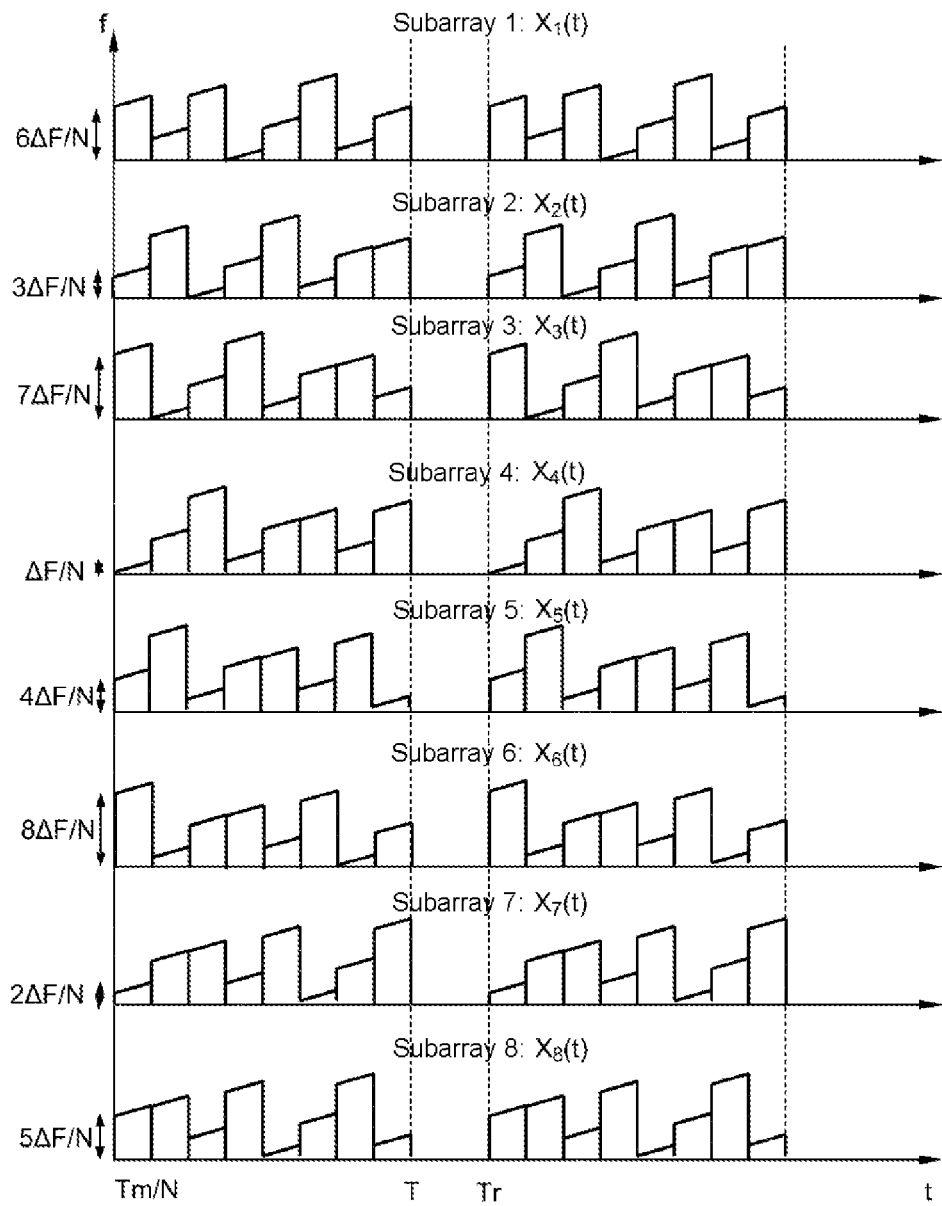

FIG. 8 represents an example of the distribution of the different sub-patterns in transmission in a diagram in which the x axis is the time axis and the y axis represents, for a given subarray, the amplitude of the patterns assigned to a given subarray. The different sub-patterns can be assigned in any order to the transmission from the different subarrays.

If the line corresponding to the subarray X1(t) is considered, over time, the following succession of patterns will be found: 6 ΔF/N, 3 ΔF/N, 7 ΔF/N, ΔF/N, 4ΔF/N, 8ΔF/N, 2 ΔF/N, 5 ΔF/N for the period 8*Tm/N.

If the signals transmitted by the N individual subarrays are added together for the period Tm/N, the value obtained corresponds to the sum of the N signals transmitted for a given individual subarray.

Figure 9:
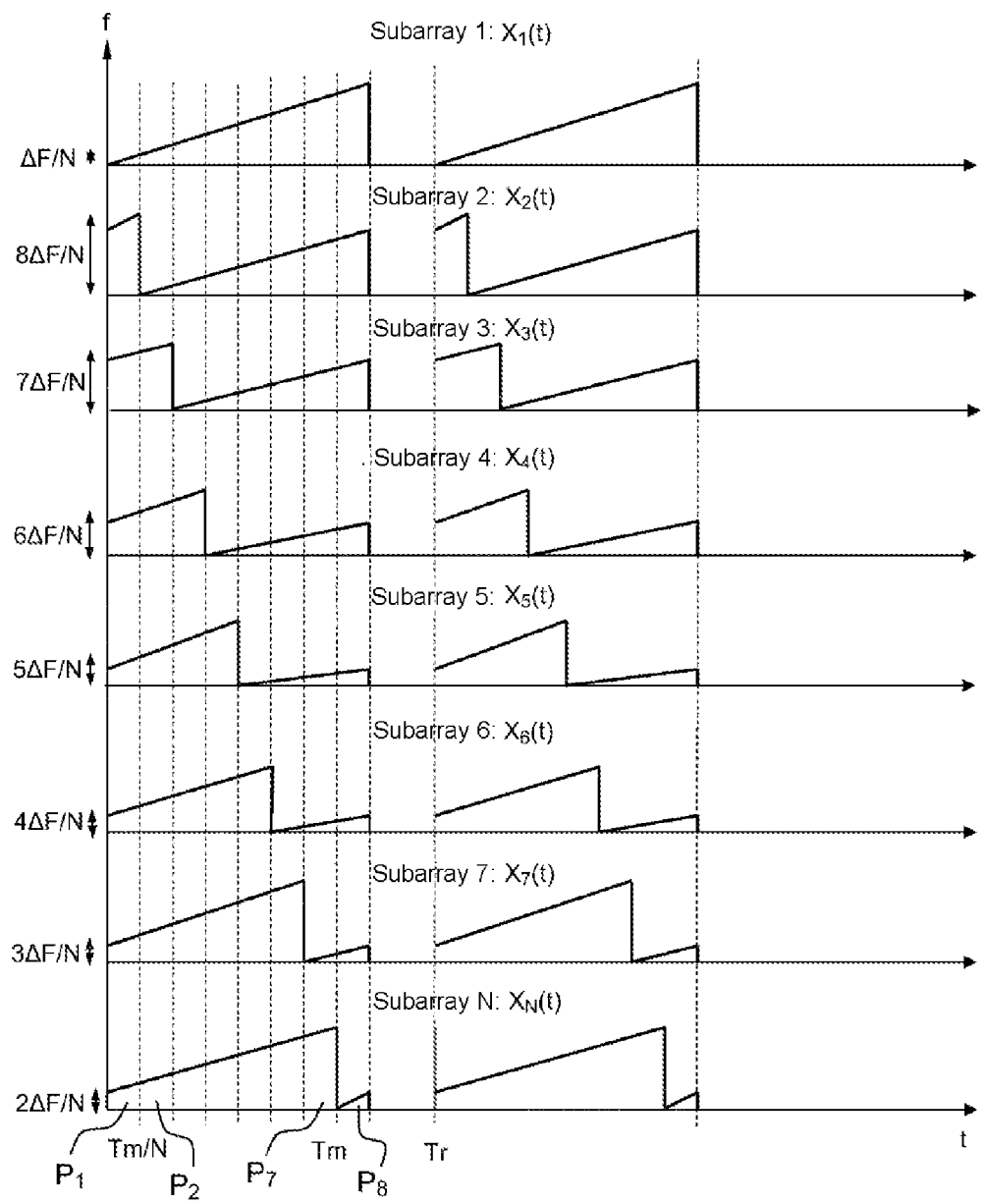

FIG. 9 schematically represents an exemplary implementation in which a same "chirp" pattern is used to feed the different subarrays with a progressive delay varying by a pitch corresponding to Tm/N, that is to say the duration of the pattern divided by the number of subarrays.

Considering the subarray 1, $X_1(t)$ corresponds to a ramp consisting of a succession of ramps of duration Tm/N and of amplitude beginning at ΔF/N, 2 ΔF/N, 3 ΔF/N, . . . 8 ΔF/N.

The subarray $X_2(t)$ is associated with the pattern 8 ΔF/N over a duration Tm/N followed by the patterns ΔF/N, 2 ΔF/N, 3 ΔF/N, . . . 7 ΔF/N.

The subarray N is associated with the succession of patterns 2 ΔF/N, . . . , 8 ΔF/N, ΔF/N.

The transmission signals of the different sub-arrays are thus deduced from one another by a circular permutation of the following form:

$$X_{i+k}(t)=X_i(t-kT_m/N) \quad (1)$$

Similarly, the frequency of the signal transmitted by the subarray i at the instant t is equal to:

$$F_{i+k}(t)=F_i(t)-k\Delta F/N \quad (2)$$

In the time domain, the orthogonality condition is expressed: whatever the value of I, whatever the value of p $$\int_t^{t+Tm/N} X_l(t)\overline{X}_p(t)\,dt = 0 \quad (3)$$

which is true if ΔF=kN/Tm in which k is an integer.

Figure 10:
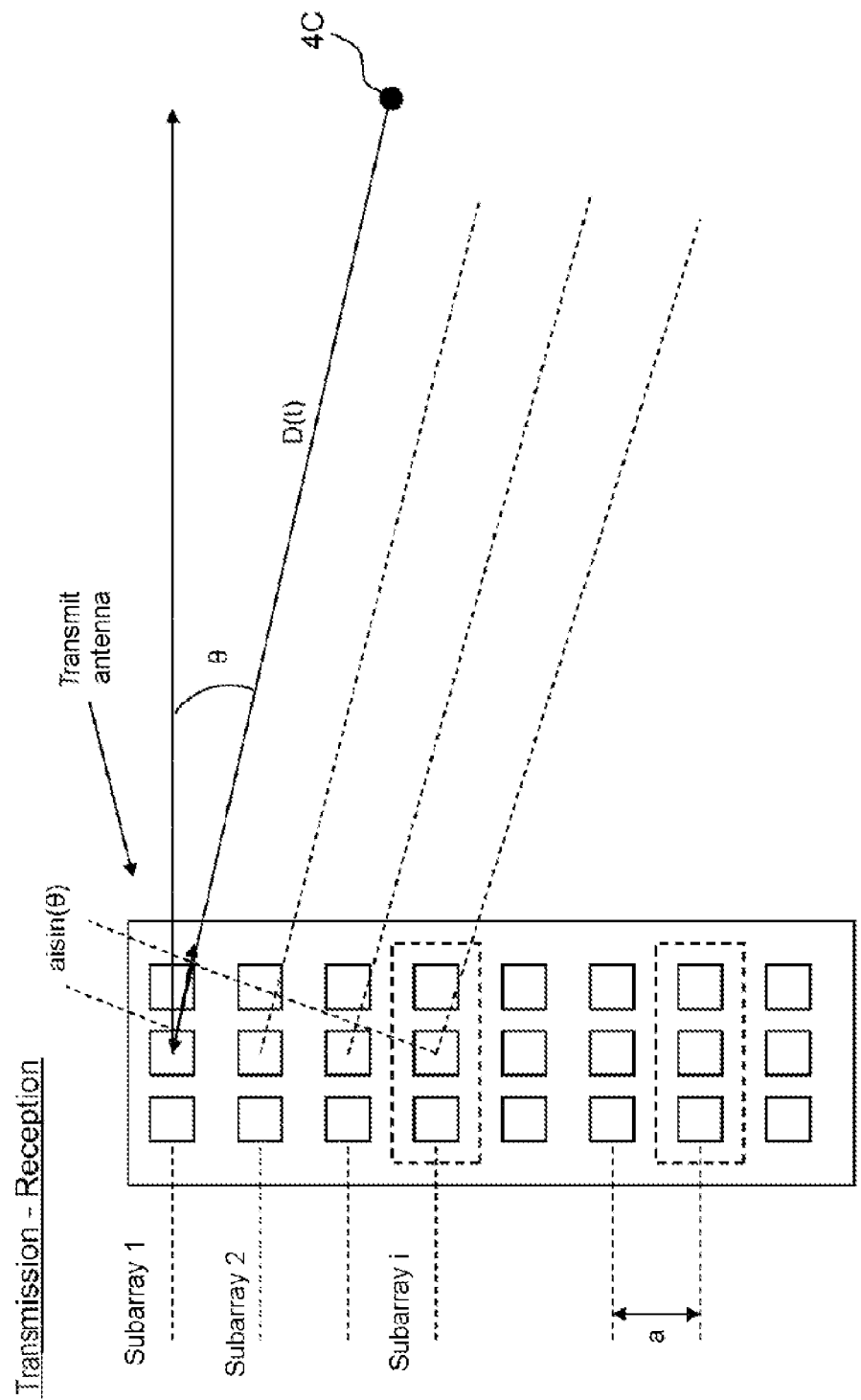

FIG. 10 schematically represents the reception of the signals on the M individual subarrays 22$j$ of the receive antenna.

The reception signal $S_j(t)$ of the subarray j can be expressed in the following form:

$$S_j(t) = A\sum_{i=1}^{N} X_i(t - \tau_{i,j}) \quad (4)$$

in which:

A corresponds to a coefficient of attenuation and $\tau_{i,j}$ corresponds to the propagation delay between the transmission on the subarray i and the reception on the subarray j.

For a given transmit subarray, the propagation delay is a function of the distance D(t) from the target, the distance being identified relative to the phase center of the subarray, and the direction θ of the target 4C.

Assuming that the transmit and receive subarrays are very close, there is, for an obstacle or object 4C at infinity in the direction θ relative to the normal to a regular alignment of subarrays: the propagation delay which is expressed by:

$$\tau_{i,j}(t) = \frac{2R(t) + ai\sin(\theta)}{C} \qquad (5)$$

in which:
i is the index of the subarray concerned, the origin being taken at the phase center of the first subarray
a is the distance between two subarrays
C is the speed of light.

The reception signal of the subarray j is correlated to each recurrence Tr by matched filtering with the transmission signal of any subarray i. This operation performs a pulse compression and corresponds to a demodulation of the received signal by the replica of the transmitted signal (deramping), followed by a Fourier transform.
The operation is expressed as follows:

$$R_k(\tau_{i,j}) = \int_{kTr}^{kTr+Tm} \left( A \sum_{i=1}^{N} X_i(t - \tau_{i,j}) \right) \cdot \overline{X}_i(t) e^{-2\pi j f t} dt \qquad (6)$$

in which Tr is the recurrence period and k the index of the recurrence period to which the correlation is made.

Since the signals Xi are mutually orthogonal, the result takes the form of a series of rays:

$$R_{i,j} = A \sum_{i=1}^{N} \delta_{i,j}(f - f_{i,j}) \exp^{2j\pi\phi_{i,j}}$$

which are present at the frequencies:

$$R_{i,j} = \frac{\Delta F \tau_{i,j}}{T_m} - \frac{(i-1)\Delta F}{N} \qquad (7)$$

and have as their respective phases:

$$\varphi_{i,j} = 2\pi f \left( \tau_{i,j} - \frac{(i-1)T_m}{N} \right) \qquad (8)$$

in which f is the carrier frequency
or even, by using (5):

$$\varphi_{i,j} = 2\pi f \left( \frac{2R(t) + ai\sin(\theta)}{C} - \frac{(i-1)T_m}{N} \right) \qquad (9)$$

In practice, the Fourier transform is performed digitally on the digitized signal.

The different rays corresponding to the signals transmitted from the N transmit subarrays appear in N distinct filters, by virtue of orthogonality properties.

It is then sufficient to aggregate the signals at the output of these different filters after phase realignment, that is to say by multiplying by $\exp^{-j\phi_{i,j}}$ to perform the compression of the beam in transmission. This phase realignment is performed for each distance D(t) and for each pointing direction θ, and corresponds to a beam forming by computation.

Figure 11:
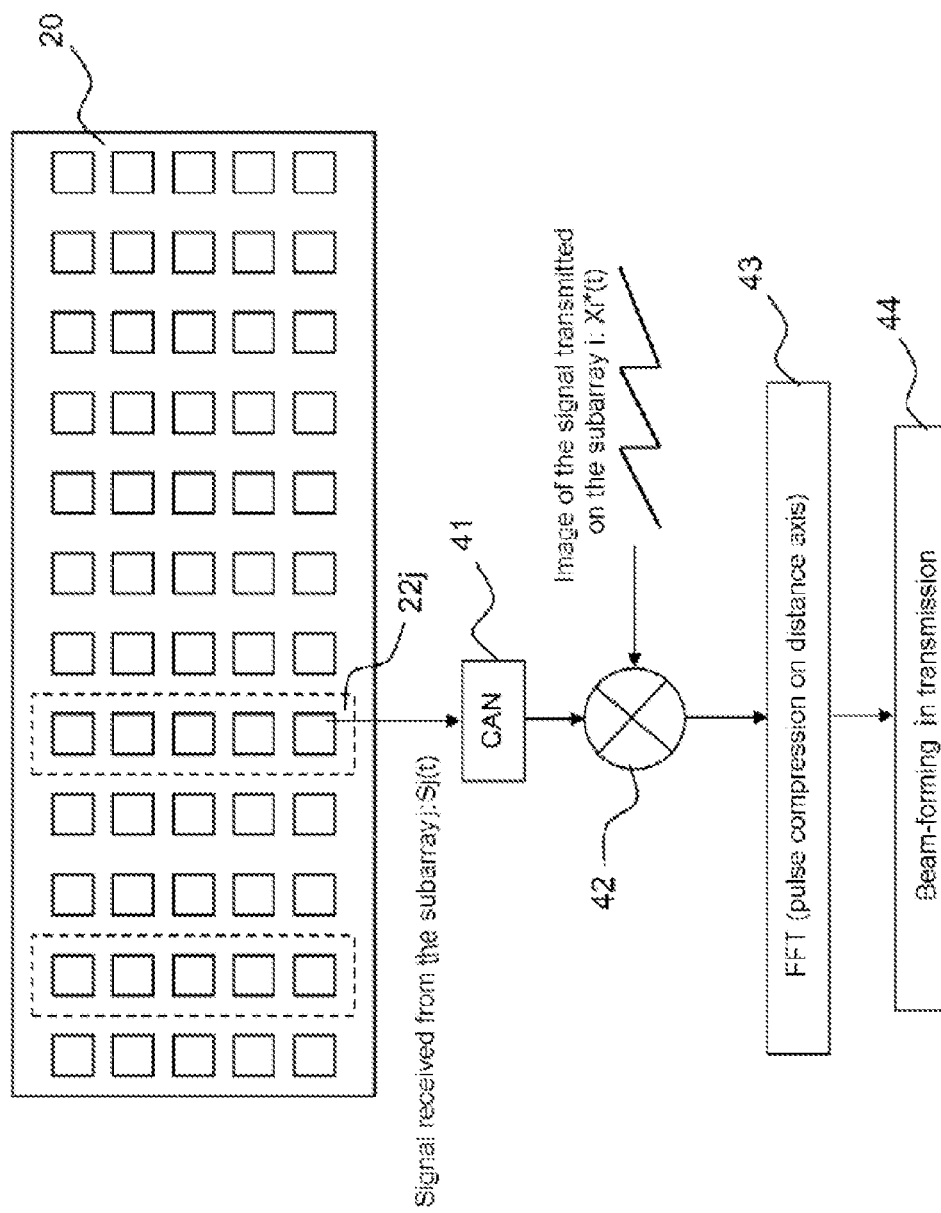

The diagram of FIG. 11 represents the successive operations carried out on the signal received on each receiving antenna subarray. The signal Sj(t) received by the subarray j is converted 41 by an analogue-digital converter into a digital signal, then it is correlated with the image of the signal transmitted on the subarray of index i. A Fourier transform is then performed 43.

At the output of this processing operation, the received signals are, on each recurrence, distributed in amplitude and in phase by distance cell and by beam direction in transmission, and this is done for each individual receive subarray of index j. There is potentially a number $Ncd=\Delta T_m$ of distance cells.

It is then possible to perform the conventional radar processing operations, such as beam forming in reception with all of the M receive subarrays, or a Doppler processing operation over several recurrences.

According to another embodiment, the receiver can comprise one or more intermediate frequency stages, the correlation can be performed in the frequency domain.

A preferential embodiment consists in separating, by a first bandpass filtering, the signals before coding and FFT so as to reduce the sampling frequency and the number of points of the FFT.

In this approach, N adjacent filters of width ΔF/N at the output of the demodulator are implemented, the assembly covering the total reception band ΔF.

Figure 12:
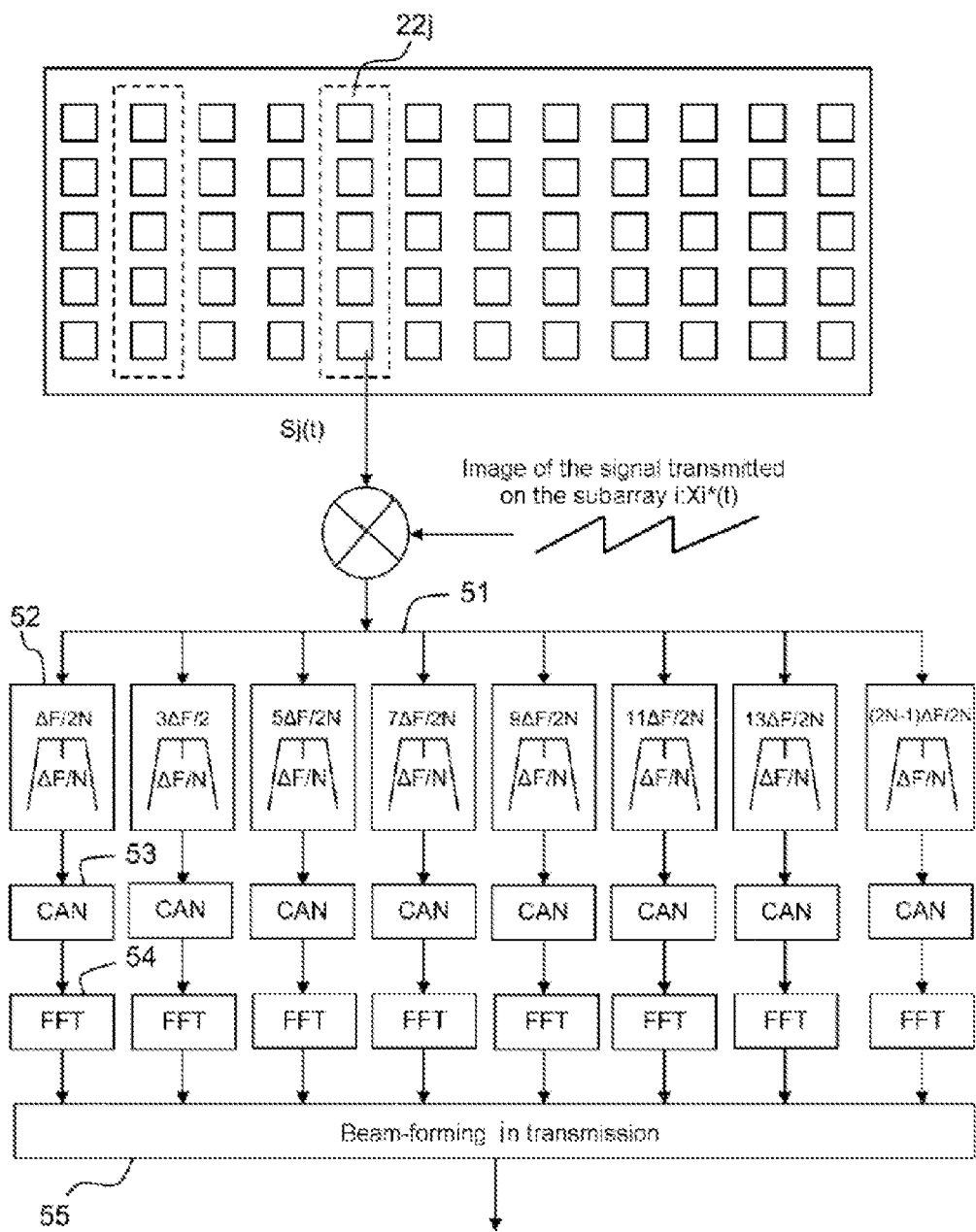

Such a scheme is represented in FIG. 12. The image of the signal transmitted on the subarray i is $X_i^*(t)$. After correlation of the signal Sj(t) with the image of the transmitted signal, the signal resulting from the correlation is distributed 51 in N spectral sub-bands. Each reception channel corresponds to a subarray, the different sub-images are first of all filtered 52, the central frequency of the filter being ΔF/2, then each filtered sub-image is converted by an analogue-digital converter 53, then subjected to a fast Fourier transform FFT 54. The sub-images are then processed 55 in order to once again find the beam in transmission by a processing operation known to those skilled in the art.

The radar according to the invention notably presents the advantage of reducing the transmission leaks of the different transmit subarrays which are distributed spectrally on N orthogonal rays. Since these leaks correspond to a propagation delay close to zero, these rays are located at the positions 0, ΔF/N, 2ΔF/N, ΔF On a given receive subarray, these leaks are aggregated in power, instead of being added together in phase, as is the case for the radars with conventional array antenna, in which the waves transmitted by each transmit subarray are identical.

Similarly, the noises borne by these leaks are generated by independent waveform generators and are aggregated in power, for example according to the configuration of FIG. 6 which represents a number of waveform generators, each being associated with a transmit subarray. This notably makes it possible to render the transmission to reception leaks incoherent.

Each waveform generator, GFO, carries a noise, and the noises are independent from one GFO to another.

Each waveform generator is itself implemented using at least one oscillator (VCO for example) and a phase loop controlled by a digital phase synthesis circuit (DDS) which is not represented in the figure for reasons of simplification.

The waveform generators GFO are synchronized by a same reference oscillator 30 (FIG. 6).

By using $a_{i,j}$ to denote the complex coupling coefficient between the transmit subarray i and the receive subarray j and p to denote the individual transmission power of each subarray, the power of the leak picked up by the subarray of rank j is expressed as follows:

$$Pf = \left(\sum_{i=1}^{N} a_{i,j}\sqrt{p}\right)^2$$

for the case of a radar according to the prior art, which corresponds to a vector sum of the leaks received by each of the individual subarrays, whereas
in the case of a radar having the structure according to the invention, the lower leak power is expressed as follows:

$$Pf = \sum_{i=1}^{N} a_{i,j}^2 p$$

which advantageously makes it possible to detect the object with a better sensitivity.

In the case where the coupling coefficients are all identical: $a_{i,j}=a$, the leak level Pf is equal to Nap in the first case and $N^2$ap in the second case. The leak is therefore reduced in a ratio N.

The same applies to the noise carried by the leak, which is linked to the spectral purity defects of the oscillators.

Since these noises are narrow band and centered on the transmission rays, a variant embodiment consists, for example, in adding, to the reception chain of the radar, a stop filter known to those skilled in the art and placed upstream whose function is notably to eliminate these rays and reduce the noise level.

One possible application of the radar according to the invention is that of a high-resolution SAR (synthetic aperture) radar.

In this example, it is possible to produce frequency ramps of 1 GHz for a resolution of 15 cm, over a duration of the order of 500 µs for an unambiguous distance from the radar of 75 km.

The transmission is, for example, performed on 32 omnidirectional subarrays and the 1 GHz band is subdivided into 32 subarrays of 34 MHz each.

Each subarray transmits an individual power P, the equivalent isotropic radiated power is EIRP=32 P.

By spreading the power over time, the peak power Pc is reduced in a ratio 10 relative to a conventional radar of 10% form factor. Given the slope of the 1 GHz/500 us frequency ramp, an intersept system suitable for detection will have a bandwidth of the order of 2 MHz and will perceive only the peak power corresponding to a single 34 MHz channel, corresponding to the transmission of a non-focused subarray. The energy received in a filter of this type will therefore be reduced in a ratio 32 relative to a radar transmitting the same power on a focused array. The overall gain in discretion is 320, or 25 dB.

Moreover, in the case of an SAR radar, the processing can be limited to a reduced distance domain corresponding to the desired ground swath and a single direction of sight, which considerably reduces the volume of computations to be performed on the received signal.

The energy transmitted by the radar according to the invention is for example distributed over a wide angular field of the order of 90°, in a wide frequency band, for example 1 GHz, and over a long time.

ADVANTAGES

The radar that is the subject of the present invention notably offers the advantage of exhibiting a dispersion of the transmitted energy simultaneously in time, in the frequency domain, and in space while limiting the effect of the transmission-to-reception leaks, by virtue of a particular method described hereinbelow.

The range of the radar according to the invention is increased with respect to the radars conventionally used in the prior art.

Compared to a conventional radar of the same transmit antenna surface area transmitting the same total power, the equivalent radiated isotropic power is divided in a ratio N. Compared to a radar with continuous transmission LPI whose energy is distributed over a frequency band ΔF for a time Tm, the same frequency band ΔF is covered for a time Tm/N which reduces the signal-to-noise ratio in the detection filter in a ratio N. The frequency spreading is performed both instantaneously and over the duration of the pattern.

The invention claimed is:

1. A radar comprising at least one transmit antenna including N individual subarrays that are non-directional in at least one plane in transmission, and a receive antenna including M individual subarrays, respective transmissions of the subarrays are orthogonal to one another by virtue of respective frequency separation and each transmission covers a sub-band of the same width, said corresponding sub-bands being separated from one another, the radar comprising:
    on the transmit antenna:
        an individual subarray of the transmit antenna is linked to a waveform generator,
        at least one oscillator is linked with N waveform generators associated with the N individual subarrays, forming an assembly adapted to generate, for each of the N individual subarrays, a waveform such that each of the N individual subarrays transmits continuous or quasi-continuous signals according to a temporal and periodic pattern such that:
            a transmission pattern covers a bandwidth ΔF for a given duration Tm,
            the transmission pattern is made up of N mutually different sub-patterns, a duration of a sub-pattern being equal to Tm/N, and covers a sub-band in the bandwidth ΔF,
            the sub-patterns transmitted by different subarrays in the N individual subarrays are deduced from one another by individual delays which are multiples of Tm/N, the N sub-patterns transmitted by the different subarrays being different during each time interval of the duration Tm/N of the sub-pattern; and
    on the receive antenna:
        each of the M individual subarrays of the receive antenna is adapted to pick up reflected signals obtained from the transmission from the N individual subarrays of the transmit antenna,
        the receive antenna comprising means adapted to perform a compression of the received signal in space and in time.

2. The radar as claimed in claim 1, wherein the oscillator is adapted to generate, on the N individual subarrays, simultaneous transmissions in different and separate frequency bands.

3. The radar as claimed in claim 1, wherein each subarray is adapted to cover all of the bandwidth ΔF during the transmission pattern of the given duration Tm.

4. The radar as claimed in claim 1, wherein the transmission pattern is a frequency ramp.

5. The radar as claimed in claim 1, wherein the N waveform generators are independent.

6. The radar as claimed in claim 1, further comprising, in reception, frequency filtering means adapted to reduce transmission leaks of the different subarrays of the transmit antenna.

7. The radar as claimed in claim 1, further comprising a single pilot oscillator linked with the N wave generators, said single pilot oscillator being adapted to perform a pattern transmission synchronization.

8. The radar as claimed in claim 1, wherein the radar is a synthetic aperture radar (SAR).

9. A method for attenuating a detection of a radar, the method being implemented in the radar as claimed in claim 1 and comprising:
   on a transmit antenna including N individual subarrays that are non-directional in at least one plane in transmission, each linked to a waveform generator:
   generating, for each of the individual subarrays, a waveform such that each of the individual subarrays transmits continuous or quasi-continuous signals according to a temporal and periodic pattern such that:
      a transmission pattern is used that covers a bandwidth ΔF for a duration Tm,
      the transmission pattern is made up of N mutually different sub-patterns, a duration of a sub-pattern being equal to Tm/N, the sub-patterns transmitted by different subarrays in the N individual subarrays are deduced from one another by individual delays which are multiples of Tm/N, the N sub-patterns transmitted by the different subarrays being different during each time interval of the duration Tm/N of the sub-pattern;
   on a receive antenna comprising M individual subarrays adapted to pick up reflected signals obtained from the transmission from the N individual subarrays of the transmit antenna:
performing a compression of the received signal in space and in time.

* * * * *